June 30, 1970   F. W. AINSWORTH   3,518,563

ELECTRONIC SYNCHRONIZATION APPARATUS

Filed Nov. 16, 1967

INVENTOR.
FRANK W. AINSWORTH

BY Bruce C Lutz

ATTORNEY

United States Patent Office 3,518,563
Patented June 30, 1970

3,518,563
ELECTRONIC SYNCHRONIZATION APPARATUS
Frank W. Ainsworth, Minneapolis, Minn., assignor to Honeywell Inc., Minneapolis, Minn., a corporation of Delaware
Filed Nov. 16, 1967, Ser. No. 683,593
Int. Cl. H03f *1/36*
U.S. Cl. 330—9                           7 Claims

ABSTRACT OF THE DISCLOSURE

An amplifier circuit which normally produces a proportional output signal which may be temporarily reduced to a low level to minimize transients which would otherwise occur when the amplifier output is connected to further electrical apparatus.

---

The invention herein described was made in the course of or under a contract or subcontract thereunder, with the Department of the Air Force.

SUMMARY OF THE INVENTION

This invention pertains to closed loop control systems and more particularly to a "fade in" circuit for reducing mode switching transients in a multiple mode control system.

In many closed loop control systems the error signal which is used to provide an input to a servo motor or control element may be derived by a number of different methods, each of which gives the control system certain advantages for a limited operating regime. In order to provide a control system which has desirable characteristics over a broad operating regime, several parallel methods of computing an error signal may be utilized within a single control system and the most desirable method is selected to supply its error signal to the control element. Thus the control system may be constructed to have a number of operating modes, each of which would be capable of providing control for certain operating conditions.

In most multiple mode control systems, a problem may exist at the time that control of the system is switched from one mode to another. When one mode has been selected to drive the system, the error signal generated in that mode is normally reduced to nearly zero by the effect of the system closed loop gain. The error signals produced by the electronics associated with the unselected modes are not within a closed control loop. Thus, when the system is switched to a different mode, a large error signal may be initially inserted into the loop. Since the time response of the control system is non-zero, a finite amount of time will be required before the error signal is reduced to zero. The transient introduced into the system may be extremely objectionable, especially in cases where the newly selected mode was selected for the expressed purpose of providing a "finer" degree of control.

Various techniques have been used in the past to decrease the magnitude of the error voltage applied to the control element at the time the control loop is closed. In early autopilot systems the pilot was required to manually reduce the servo error signal to an acceptable level by manipulating his manual aircraft controls before an automatic control mode was engaged. Since manual synchronization techniques are obviously unsuitable for modern aircraft controls, numerous synchronizer systems have been designed to track an input signal and store information or a signal corresponding to the input signal during a "synchronize" mode of operation and provide a control signal during a "hold" mode of operation where the control signal is derived from the difference between the stored signal and the input signal. Such a synchronizer is disclosed in an application of Rufus Allen, Jr. entitled Control Apparatus, Ser. No. 522,103, filed Jan. 21, 1966, and assigned to the same assignee as the present invention. Such synchronizers are well suited for highly accurate use in a control system but are far too complex for an application where it is only desired to limit the transient occurring upon engagement of an automatic control mode.

A simple lag filter could be inserted in series with a control element to eliminate the undesirable transient effects occurring during mode switching, but a lag filter would have the undesirable effect of lagging sudden changes in the input variable as well as the transient signal.

It is therefore an object of this invention to provide for a control system, a simple electronic "fade in" circuit for reducing the magnitude of the transient which occurs when a control loop is initially closed without affecting the response of the control system to rapid changes in the error signal.

The present invention is a means for temporarily reducing the error signal produced by the electronics associated with a desired mode before engagement of the mode electronics. The error signal present at the output of the circuitry associated with the desired mode is sampled and a negative feedback signal having a magnitude which is a function of the error signal is used to reduce the error signal to a low value at the time the desired mode is selected. In order to allow the system to null out the true error signal produced by the electronics associated with the desired mode, the transient reducing signal is allowed to decay.

The present invention does not introduce a lag into the control loop but merely produces a bias which nulls out the effect of the input variable at the time of switching. If a sudden change of the input variable occurs immediately after switching, it will be immediately transmitted to the control elements.

Further objects and advantages will become apparent from a reading of a specification and claims in conjunction with the drawings wherein:

Figure 1:
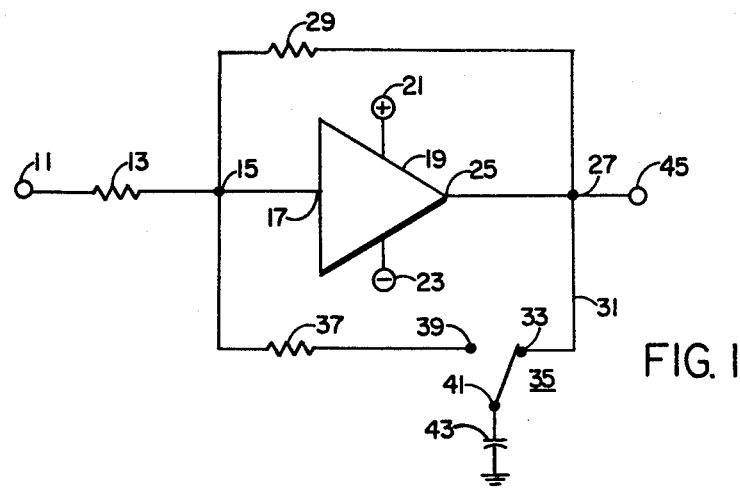
FIG. 1 is a simplified schematic of the "fade in" circuit.

In FIG. 1 an input terminal 11 is connected through a resistor 13 to a junction point 15. Junction point 15 is connected to an input terminal 17 of a high gain inverting amplifier 19. As shown, amplifier 19 is powered by a source of positive power 21 and a source of negative power 23. An output terminal 25 of amplifier 19 is connected to a junction point 27. Junction point 27 is connected through a negative feedback means, impedance means, or resistor 29 to junction point 15. Junction point 27 is also connected through a conductor 31 to a stationary contact 33 of a single pole, double throw switch 35. A resistor 37 is connected between junction point 15 and a stationary contact 39 of switch 35. A wiper terminal 41 of switch 35 is connected to ground or reference potential through an integrating means, signal level storage means or capacitor 43.

Figure 2:
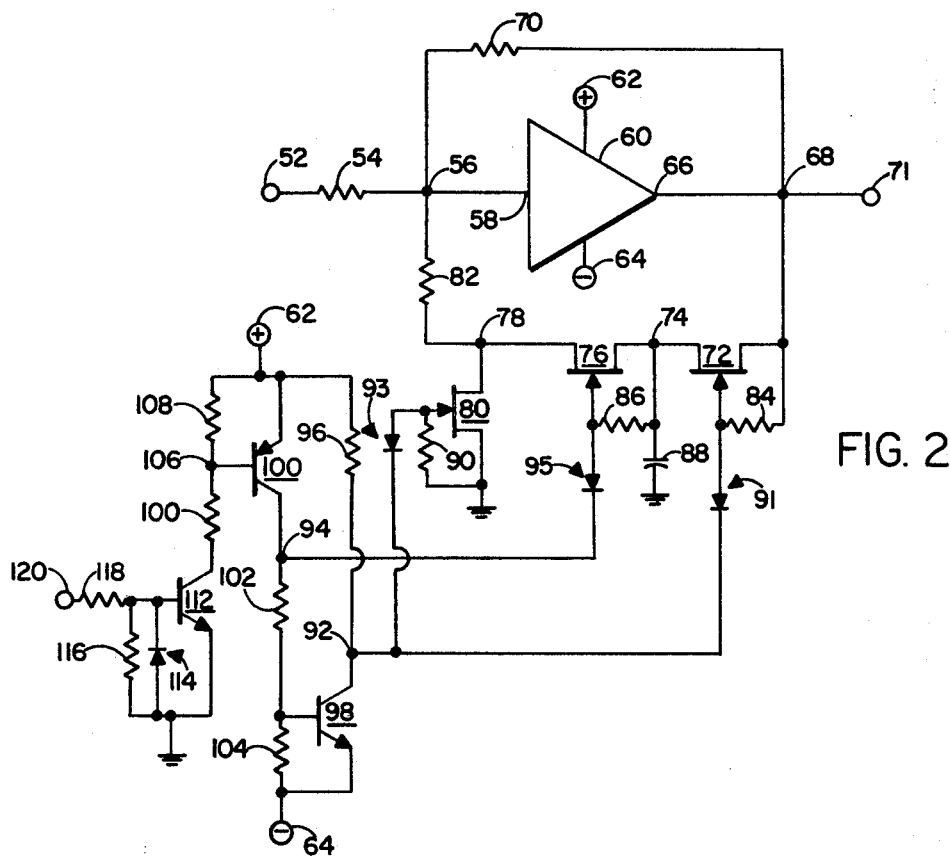
FIG. 2 is a schematic diagram of a preferred embodiment of "fade in" circuit illustrating use of solid state switching.

In FIG. 2 an input terminal 52 is connected through a resistor 54 to a junction point 56. Junction point 56 is connected to an input terminal 58 of a high gain inverting amplifier 60 which is connected to a source of positive power 62 and a source of negative power 64. An output terminal 66 of amplifier 60 is connected to a junction point 68 which is connected through an impedance means or a resistor 70 to terminal 56. Junction point 68 is also connected to an output terminal 71 and to a source terminal of an *n*-channel field effect transistor 72. The words "field effect transistor" will be hereinafter abbreviated FET. The drain terminal of FET 72 is connected to a junction point 74 which is also connected to a source terminal of an *n*-channel FET 76. A drain terminal of FET 76 is connected to a junction point 78 which is also connected to a drain terminal of an *n*-channel FET 80. Junction point 78 is also connected through an impedance means or a resistor 82 to junction point 56. A resistor 84 is connected between the source and a gate terminal of FET 72. A resistor 86 is connected between the source and a gate terminal of FET 76. A capacitor 88 is connected between junction point 74 and ground. A resistor 90 is connected between a grounded source terminal and a gate terminal of FET 80. The gate terminal of FET 72 is connected to an anode of a diode 91, the cathode of which is connected to a junction point 92. A gate terminal of FET 80 is connected to an anode of a diode 93, the cathode of which is connected to junction point 92. A junction point 94 is connected to a cathode of a diode 95, the anode of which is connected to the gate of FET 76. The junction point 92 is connected through a resistor 96 to the source of positive voltage 62 and is also connected to a collector of an NPN transistor 98. An emitter of transistor 98 is connected to source 64. Junction point 94 is connected to a collector of a PNP transistor 100 and is also connected through a resistor 102 to a base of transistor 98. The base of transistor 98 is also connected through a resistor 104 to source 64. An emitter of transistor 100 is connected to source 62. A base of transistor 100 is connected to a junction point 106 which is connected through a resistor 108 to source 62 and is also connected through a resistor 110 to a collector of an NPN transistor 112. An emitter of transistor 112 is connected to ground and a base of transistor 112 is connected to a cathode of a diode 114, the anode of which is also connected to ground. A resistor 116 is connected in parallel with diode 114. A resistor 118 is connected between a logic input 120 and the base of transistor 112.

As shown in FIG. 1, the "fade in" circuit is configured as it would normally be before being selected to drive the control element of the control system. Input signals from the applicable sensors are connected to input terminal 11. Output terminal 45 is initially not connected to the control system. Switch 35 is in a "standby" condition connecting capacitor 43 to the output 25 of amplifier 19. If a steady state positive voltage is applied to input terminal 11 of FIG. 1, a current will be passed through the input resistor 13 to junction point 15 and input terminal 17 of amplifier 19. Since amplifier 19 is an inverting amplifier, the voltage appearing at output terminal 25 will have a negative polarity. The negative voltage at terminal 25 is conducted to junction point 27 and forces a negative current through resistor 29 to junction point 15. The negative feedback through resistor 29 tends to reduce the voltage of the amplifier at output 25. If the gain of the amplifier 19 is large, the voltage at terminal 25 will be equal to the negative of the voltage applied to terminal 11 multiplied by the ratio of the magnitude of feedback resistor 29 to the magnitude of input resistor 13.

When it is desired to "enable" the control system operating mode wherein the error signal is to be derived from sensors driving the circuitry of FIG. 1, switch 35 is moved from the "standby" position shown in FIG. 1 to the position wherein terminal 39 is connected to capacitor 43. When switch 35 was in the first position capacitor 43 was rapidly charged to a voltage equal to the voltage at the output 25 of amplifier 19. After switch 35 is moved to the second position, the voltage appearing across capacitor 43 drives a current through resistor 37 to junction point 15. If the original steady state positive voltage applied to terminal 11 has remained essentially unchanged, a positive input current through resistor 13 is summed at junction point 15 with a negative feedback current through resistor 29 and a further negative current applied through resistor 37 by the charged capacitor 43. The additional negative current applied through resistor 37 tends to reduce the magnitude of the voltage at the output terminal 25 of amplifier 19. As the voltage at output terminal 25 decreases, the feedback current through resistor 29 proportionately decreases. The feedback current through resistor 37 is independent of the voltage at 25. It is clear that if the negative current applied through resistor 37 is equal to the feedback current which was being applied through resistor 29 at the time the switch 35 was moved, the output voltage at terminal 25 of amplifier 19 will be substantially equal to zero volts. As the capacitor 43 discharges an output voltage which is a function of the signal applied to terminal 11 appears at output terminal 25. Thus, the circuit of FIG. 1 acts to reduce the steady state output voltage at the circuit output terminal 45 to zero volts at the time that switch 35 is moved to the "engage" position and the output terminal 45 is connected to the control elements. It is also clear from a nature of the circuitry in FIG. 1 that the rapid changes in the input signal applied to terminal 11 which occur after the switching of switch 35 and before the voltage across capacitor 43 has decayed will not be modified and output signals proportional to the changes in the input signal will be available instantly at the output terminal 45.

The operation of the preferred embodiment of the "fade in" circuit of FIG. 2 is quite similiar to that shown in FIG. 1. Amplifier 60 provides an output at terminal 66 which is inverted in polarity from the input signal applied at terminal 52 and is equal to the negative of the input voltage at terminal 52 multiplied by the ratio of the magnitudes of the feedback resistor 70 and the input resistor 54. When the "fade in" circuit of FIG. 2 is in a "standby" mode and its output is selected to drive the control element, the logic voltage applied at terminal 120 is equivalent to a ground or zero volt signal. Transistor 112 remains OFF and the high potential at terminal 106 back biases the base emitter junction of transistor 100 which remains OFF, the potential at junction point 94 remaining at a low value. The potential at the base of transistor 98 is also small and transistor 98 is back biased. Since transistor 98 is biased OFF, the voltage at terminal 92 is a high potential. The positive potential at junction point 92 back biases diodes 91 and 93 thus allowing FET's 72 and 78 to operate in the turned ON mode wherein there is a low impedance between the source and the drain. The negative voltage at terminal 94 back biases FET 76 producing an extremely high impedance between terminals 78 and 74. Thus, the voltage at output terminal 66 of amplifier 60 is connected through forward biased FET 72 to capacitor 88. FET 76 essentially open circuits the feedback path from capacitor 88 to terminal 56 and FET 80 provides a low impedance to ground from terminal 78. Resistors 84, 86 and 90 are extremely large resistors used in the bias networks of FET's 72, 76 and 80 and may be assumed to be of such magnitude that their effect upon the signal path may be ignored. Thus, when the logic voltage at terminal 120 is a zero volt signal the output voltage at terminal 66 in connected through a low impedance to capacitor 88. Capacitor 88 is able to follow rapid fluctuations in the output voltage because of the low impedance connected between the capacitor and the low impedance output of the amplifier.

When the electronics supplying signals to terminal 52 of the "fade in" circuit in FIG. 2 are engaged to provide the error signal for the control elements, a positive logic voltage is applied to terminal 120 and terminal 71 is connected to the control elements. A positive voltage applied to terminal 120 forward biases transistor 112 which switches terminal 106 to a low voltage and forward biases transistor 100. When transistor 100 is turned ON, terminal 94 and the base of transistor 98 rise to a high voltage. Transistor 98 is turned ON and the collector of transistor 98 becomes a negative voltage. The positive voltage at terminal 94 reverse biases diode 95 and FET 76 is turned ON. The negative voltage at terminal 92 forward biases diodes 91 and 93 and FET's 72 and 80 are turned OFF. Thus, when positive logic signals are applied to terminal 120, the capacitor 88 is disconnected from the output terminal 66 of amplifier 60 and is connected through FET 76 and resistor 82 to terminal 56. As in FIG. 1, if the current applied through resistor 82 is equal to the feedback current in resistor 70 immediately preceding the application of the positive logic voltage to terminal 120, the output voltage at terminal 66 will switch to substantially zero volts. As capacitor 88 discharges the current through resistor 82 decreases and the steady state voltage at terminal 52 introduces a slowly increasing error voltage at output terminal 66 of amplifier 60 and the error voltage is transferred to the control elements to change the condition of the control system. The "fade in" circuit therefore, suppresses the effect of the steady state voltage appearing at terminal 52 at the instant the enabling logic signal is applied, but as in FIG. 1, it can be seen that rapid changes in the signal applied to terminal 52 after application of the logic signal at terminal 120 and before decay of the voltage across capacitor 88 will not be suppressed but will produce an immediate change in the error signal applied to the control apparatus.

Alterations and variations will be obvious to those skilled in the art.

I claim:

1. In a control system including an input means for receiving an error signal comprising in combination:
   amplifying means including input means, output means, and feedback means, the signal at the output means of said amplifying means having a polarity opposite to that of signals applied to the input means;
   means continuously connecting the input means of said amplifying means to said control system input means to receive the error signal;
   signal level storage means;
   switching means having first, second, and third terminals, the first terminal of said switching means connected to the output means of said amplifying means, the second terminal of said switching means connected to one side of said signal level storage means having its other side connected to ground, said switching means having a first or standby condition wherein the first and second terminals are connected by a low impedance and are isolated from the third terminal and said third terminal is connected through a low impedance to ground, said switching means having a second condition where the second and third terminals are connected by a low impedance and isolated both from the first terminal and from ground;
   a resistor connected to the third terminal of said switching means and to the input means of said amplifying means; and
   means for switching said switching means from the first or standby condition to the second or enabling control system operation condition whereby the magnitude of any signal initially delivered to the control system amplifying means output means is substantially reduced by said storage means.

2. Apparatus of the class described in claim 1 wherein said signal level storage means is a capacitor.

3. Apparatus of the class described in claim 1 wherein said resistor connecting the third terminal of said switching means to the input means of said amplifying means has an impedance equal to the impedance of said feedback means of said amplifying means whereby the magnitude of any signal supplied to the control element is reduced to a substantially zero level signal when said first switching means is switched from said first to said second condition.

4. Apparatus of the class described, comprising in combination:
   amplifying means including an input terminal and an output terminal;
   reference potential means;
   feedback means connecting the output terminal and the input terminal of said amplifying means;
   impedance means connected at one end to the input terminal of said amplifying means;
   capacitor means connected at one end to said reference potential means;
   normally closed switching means connected between the output terminal of said amplifying means and the other end of said capacitor means;
   signal supplying means connected to the input terminal of said amplifying means;
   normally open switching means connected between the other end of said impedance means and the other end of said capacitor means; normally closed switching means between said other end of said impedance means and reference means; and
   means for simultaneously opening both said normally closed switching means and closing said normally open switching means to disconnect both said capacitor from the output terminal of said amplifying means said other end of said impedance means from the reference potential means and connect said capacitor to the other end of the impedance means to form an additional input means of said amplifying means.

5. Apparatus of the class described in claim 5 wherein both said normally closed switching means and said one normally open switching means are field effect transistors.

6. Apparatus of the class described, comprising in combination:
   amplifier means including input means and output means;
   reference potential means;
   a source of positive power;
   a source of negative power;
   a first impedance means connected between said output means and said input means of said amplifier means;
   first field effect transistor means including source means connected to said output means of said amplier means, and also including drain means and gate means;
   capacitor means connected between said reference potential means and said drain means of said first field effect transistor means;
   second field effect transistor means including source means connected to said drain means of said first field effect transistor means and also including gate means and drain means;
   third field effect transistor means including drain means connected to said drain means of said second field effect transistor, source means connected to said reference potential means and gate means;
   impedance means connected between the drain means of said third field effect transistor and said input means of said amplifier means;
   signal input means connected to said input means of said amplifier means; and
   means for biasing said first, second, and third field effect transistors, said means having two operating conditions, the first operating condition biasing said first and third field effect transistor to a low impedance mode and said second field effect transistor to a high impedance mode, the second operating condition biasing said second field effect transistor to a low impedance mode and said first and said third field effect transistors to a high impedance mode.

7. Apparatus of the class described in claim 7 wherein said means for biasing said first and second and third field effect transistor means include input means and plural output means comprising, in combination:
   first NPN transistor means including base, emitter, and collector means, the emitter of said first NPN transistor means connected to reference potential means the base connected to said input means;
   means connecting the base means of said first NPN transistor to said reference potential means;

unidirectional current conducting means connecting the base means of said first NPN transistor to said reference potential means with the direction of easy current flow between said reference potential means and said base means;

first PNP transistor means including base emitter and collector means, the emitter means of said first PNP transistor connected to the source of positive power;

second NPN transistor including base, emitter, and collector means, the emitter means of said second NPN transistor connected to said source of negative power;

means connecting said collector means of said PNP transistor to said base means of said second NPN transistor;

means connecting said base means of said second NPN transistor to said source of negative power;

means connecting said source of positive power to said collector of said second NPN transistor;

means connecting said collector means of said PNP transistor to said gate means of said second field effect transistor; and means connecting said collector means of said second NPN transistor to said gate means of said first and third field effect transistors.

References Cited

UNITED STATES PATENTS

| | | | |
|---|---|---|---|
| 3,448,393 | 6/1969 | Rice | 330—9 |
| 3,050,673 | 8/1962 | Widmer | 307—229 X |
| 3,153,202 | 10/1964 | Woolam | 330—9 |
| 3,158,759 | 11/1964 | Jasper | 328—151 X |
| 3,249,748 | 5/1966 | Fluhr | 328—127 X |
| 3,389,346 | 6/1968 | Webb | 330—51 |
| 3,390,347 | 6/1968 | Jones et al. | 328—151 X |

ROY LAKE, Primary Examiner

J. B. MULLINS, Assistant Examiner

U.S. Cl. X.R.

307—238; 328—151; 330—86, 110